United States Patent Office 2,871,241
Patented Jan. 27, 1959

2,871,241
(N-ALKYL-4-PIPERIDONE)-HYDRAZONES

Ernst Jucker, Binningen, Basel Land, Erwin Rissi, Basel, Rudolf Suess, Rheinfelden, Arnold Vogel, Basel, and Eberhard Wolff, Riehen, near Basel, Switzerland, assignors to Sandoz Ltd., Basel, Switzerland, a Swiss firm No Drawing. Application December 10, 1957
Serial No. 701,718

Claims priority, application Switzerland
December 13, 1956

4 Claims. (Cl. 260—294)

The present invention relates to acyl-hydrazones which are valuable as therapeutica.

The compounds of the present invention which, more specifically designated, are (N-alkyl-piperidone)-acyl-hydrazones correspond to the following formula

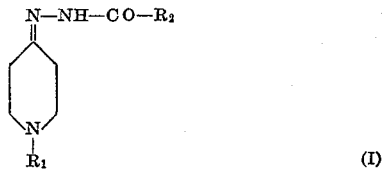
(I)

wherein $R_1$ stands for lower alkyl (e. g. methyl, ethyl), and $R_2$ stands for a pyridine nucleus.

The aforesaid Compounds I are prepared by condensing the N-alkyl-4-piperidones of the formula

(II)

wherein $R_1$ has the precedingly-recited significance, with the appropriate hydrazides of pyridine-carboxylic acids, corresponding to the formula $$H_2N-NH-CO-R_2 \quad (III)$$

wherein $R_2$ has the precedingly-recited significance. Alternatively, hydrazones of the formula

(IV)

are reacted with reactive derivatives of pyridine-carboxylic acids of the formula $$X-OC-R_2 \quad (V)$$

wherein X stands for halogen or O-alkyl, $R_1$ in Formula IV and $R_2$ in Formula V having the precedingly-recited significances.

For example, a suspension of a hydrazide of a pyridine-carboxylic acid of Formula III in absolute ethanol is heated with a solution of an N-alkyl-4-piperidone of Formula II, e. g. 1-methyl-4-piperidone, or else a 1-alkyl-4-piperidone-hydrazone of Formula IV is acylated with a reactive pyridine-carboxylic acid derivative of Formula V.

The satisfactory chemotherapeutic treatment of tuberculosis is a long-standing problem. Mention may be made in this regard of inorganic and organic gold compounds (which, however, are no longer employed), and of sulfones, thiosemicarbazones, mercaptotriazinones, thiohydantoins, various antibiotics, e. g. streptomycin, p-aminosalicylic acid and derivatives thereof, etc., used for such treatment.

A new class of tuberculostatics was found in the hydrazides of the 4-pyridine-carboxylic acids. Thus, isonicotinic acid hydrazide is a recognized tuberculostatic, which has shown the greatest activity of all the hitherto clinically employed compounds, and which is being used in human as well as in veterinary medicine. It has been found, however, that in the use of isonicotinic acid hydrazide as well as other tuberculostatics, the tuberculosis bacilli readily develop a tolerance and resistance to the medicaments upon prolonged administration thereof. For this reason, it is usual to alternate medicaments, and it is therefore advantageous to increase the number of well tolerable tuberculostatics. The present invention realizes such advantage, since the compounds thereof are such well tolerable tuberculostatics.

Reference to the literature shows that e. g. isonicotinic acid hydrazide may be bound up with undesired side effects, such as dizziness, particularly in elderly persons, muscular spasms, constipation, drowsiness, increased tendon reflexes, etc.

As tuberculostatics, the compounds of the present invention offer various advantages over prior tuberculostatics. Thus, with low toxicity, they are practically free of undesired side effects, so that large doses such as are unavoidable in the treatment of tuberculosis are well tolerated. Because of the good water-solubility of their salts with acids, due to the presence of the piperidylidene radical, they are particularly suitable for the preparation of infusion solutions, whereby they are distinguished from known tuberculostatics. However, they may also be administered perorally or rectally.

The inhibitory action of the compound I of the present invention against various strains of tuberculosis bacilli is equal to that of isonicotinic acid hydrazide. On human strains of tuberculosis bacilli (*Mycobacterium tuberculosis*) total inhibition is achieved at a dilution of 1:16,000,000 and partial inhibition at a dilution as low as 1:25,000,000.

The acyl-hydrazones of the present invention are, at room temperature (about 20° to 30° C.) solid crystalline bases which form stable salts with various organic or inorganic acids. Thus, the bases form inter alia hydrohalides, e. g. hydrochlorides and hydrobromides, tartrates, methane-sulfonates, etc.

The following examples set forth presently-preferred representative embodiments of the invention. In these examples, the parts are by weight unless otherwise indicated, the relationship between parts by weight and parts by volume being the same as that between grams and milliliters. Temperatures are in degrees centigrade. Melting points are corrected.

Example 1

A solution of 11.3 parts of N-methyl-4-piperidone in 50 parts by volume of ethanol is added dropwise to a suspension of 13.7 parts of isonicotinic-acid-hydrazide in 200 parts by volume of ethanol. The reaction mixture is boiled under reflux for 4 hours, after which the ethanol is evaporated off under reduced pressure. The so-obtained crude (N-methyl-4-piperidone)-isonicotinoyl-hydrazone is crystallized three times from a mixture of ethanol and ether; the thus-purified product melts at 174–177°.

Example 2

A solution of 1 mol of isonicotinic-acid-chloride in benzene is added, with stirring and ice-cooling, to a solution of 1 mol of (N-methyl-4-piperidone)-hydrazone and 1 mol of triethylamine in benzene. The mixture is stirred for 3 more hours at ordinary temperature, after which precipitated triethylamine hydrochloride is filtered off. The filtrate is evaporated to dryness under reduced pressure at 70°, and the crystalline residue is recrystallized three times from a mixture of ethanol-ether. The so-obtained (N-methyl-4-piperidone)-isonicotinoyl-hydrazone melts at 174–177°.

*Example 3*

A solution of 13.0 parts of N-ethyl-4-piperidone in 50 parts by volume of ethanol is added dropwise to a suspension of 13.7 parts of isonicotinic-acid-hydrazide in 200 parts by volume of ethanol. The reaction mixture is boiled under reflux for 4 hours, after which the ethanol is evaporated off under reduced pressure. The so-obtained crude (N-ethyl-piperidone)-isonicotinoyl-hydrazone is crystallized from a mixture of ethanol and ether.

*Example 4*

A solution of 1 mol of nicotinic-acid-chloride in benzene is added, with stirring and ice-cooling, to a solution of 1 mol of (N-ethyl-4-piperidone)-hydrazone and 1 mol of triethylamine in benzene. The mixture is worked up as in Example 2. The crude (N-ethyl-4-piperidone)-nicotinoyl-hydrazone is recrystallized from a mixture of ethanol-ether.

The present application is in part a continuation of copending application, Serial No. 632,023, filed January 2, 1957.

Having thus disclosed the invention, what is claimed is:

1. A compound selected from the group consisting of (N-alkyl-4-piperidone)-nicotinoyl-hydrazone, (N-alkyl-4-piperidone)-isonicotinoyl-hydrazone, and the non-toxic salts of these hydrazones with acids, the alkyl group being a lower alkyl of no more than two carbon atoms.
2. (N-methyl-4-piperidone)-isonicotinoyl-hydrazone.
3. (N-ethyl-4-piperidone)-isonicotinoyl-hydrazone.
4. (N-ethyl-4-piperidone)-nicotinoyl-hydrazone.

No references cited.